March 10, 1953        E. JONES        2,630,939
RUPTURE DISK UNIT
Filed June 24, 1949
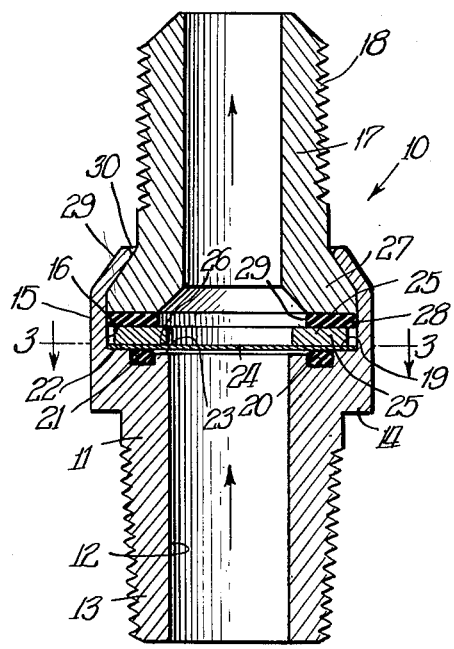
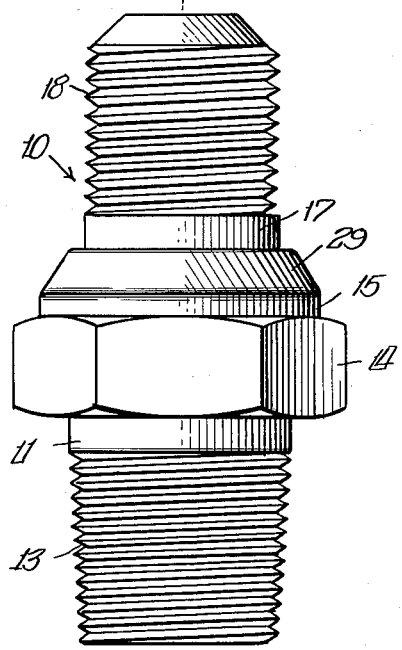
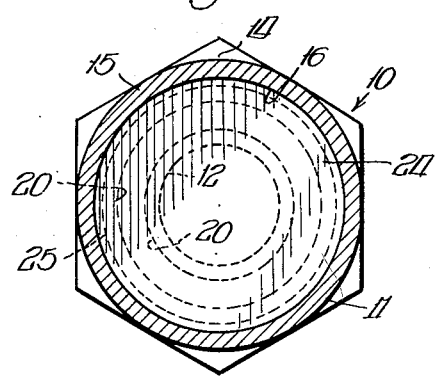
INVENTOR.
Evan Jones,
BY
Cromwell, Greist & Warden
Attys.

Patented Mar. 10, 1953

2,630,939

UNITED STATES PATENT OFFICE 2,630,939

RUPTURE DISK UNIT

Evan Jones, Evanston, Ill., assignor to Henry Valve Company, Incorporated, Chicago, Ill., a corporation of Illinois Application June 24, 1949, Serial No. 101,127

1 Claim. (Cl. 220—89)

The present invention pertains to an improved and thoroughly reliable yet inexpensive rupture disk assembly or unit adapted to serve as a safety element in a pressure fluid handling line or system.

It is an object of the invention to provide a self-contained unit of the foregoing character including a pair of connector fittings adapted for ready and quick assembly of the unit in the protected line or system, a thin, readily rupturable rupture disk of an appropriate thin metallic foil, and improved provisions for clamping said disk in sealed relation to and between said fittings, in which unit the cost of parts and the assembly thereof are reduced to a minimum so as to enable the same to be merchandised as a "throw away" unit.

It is a further object of the invention to provide an inexpensive rupture disk assembly or unit which, because of the above improved structural details and relationships of parts, is readily and quickly assembled in a pressure line or system, using readily available tools, without requiring the usual time consuming operations of pre-assembling the parts of the rupture disk assembly.

A still further object of the invention is to provide a rupture disk unit of the sort referred to above characterized by a rupture element which is fabricated of a very thin, frangible metal foil clamped in an improved manner and without distortion between a pair of coacting hollow fittings, whereby damage to or straining of said foil element in assembly is avoided; and which element is maintained in said clamped relation in an improved and simplified fashion enabling fabrication of the unit as a whole at a very low cost.

The foregoing statements are indicative in a general way of the nature of the invention, but other and more specific objects will be apparent to those skilled in the art upon a full understanding of the construction and operation of the device.

A single embodiment of the invention is presented herein for purpose of illustration, but it will be appreciated that the invention is susceptible of incorporation in other modified forms coming equally within the scope of the appended claim.

In the drawings:

Fig. 1 is a view in vertical, longitudinal cross section through the unit of the invention, along line 1—1 of Fig. 2;

Fig. 2 is an external, elevational view of the unit; and

Fig. 3 is a view in section along line 3—3 of Fig. 1.

A common objection to certain existing types of rupture disk installations embodying a rupturable element of thin frangible material has resulted from the fact that the operation of clamping the rupture element or disk between a pair of coacting parts so stresses the relatively weak disk as to either cause the immediate failure by tearing or bursting thereby rendering the same inoperative prior to actual use, or to so distort or weaken it as to destroy the intended resistance of the rupture disk to pressures less than the critical rupture pressure. Furthermore, the assembly means for the disks are usually relatively expensive. The present rupture disk unit overcomes these objections.

Referring to the drawings, the improved rupture disk unit is generally designated by the reference numeral 10. It comprises an inlet fitting 11 having an axial bore 12 and terminating in a threaded nipple portion 13 by means of which the unit is adapted to be quickly and easily mounted in a pressure line or system to be protected, under field or service conditions. To facilitate such installation, the fitting 11 is provided with a hexagonal body portion 14 (see Fig. 3).

An annular rib or flange 15 of circular shape extends axially from the body portion 14, said flange being of sufficient thickness to maintain its shape and withstand the conditions of use of the unit, but being deformable as by spinning, for a purpose to be described. The space 16 internally of flange 15 is circular in cross section, as illustrated in Fig. 3, and receives the sealing elements of the unit or assembly, as well as the coupling side of the second or discharge side fitting 17 of the unit. Like the fitting 11, fitting 17 has an externally threaded nipple 18 for installation in a pressure line or system.

The axially exposed face 19 of the inlet fitting 11, within the space 16, is provided with an annular groove 20 of predetermined axial depth which is concentric with the bore 12 and spaced outwardly therefrom. Groove 20 receives an O-ring or like sealing ring 21 of flexible, resilient material such as rubber, synthetic rubber and the like, the diameter of said O-ring 21 being sufficiently great to project slightly above the land or surface 22 of the fitting face 19 outwardly of groove 20. The land or surface 23 of said face 19 which is on the inner radial side of groove 20 is of slightly less height than the land 22, to avoid direct contact with the rupture disk 24 immediately adjoining its central, effective area.

Said rupture disk 24 is of circular shape and is disposed within the space 16 and across the fitting face 19. It is of a readily frangible material, preferably a silver foil of thickness only sufficiently great to contain the maximum permissible pressure in the inlet fitting 11. For example, for a pressure of from 200–300 pounds per square inch, the minimum thickness of the silver foil disk 24 will be approximately .002″. Generally, the disk will range from .001–.003″ in thickness for a common type of installation, i. e., in a refrigeration system. Although silver foil is a highly desirable material, being resistant to attack and deterioration by most agents, particularly refrigerant fluid, it is to be understood that other metallic foils or sheets presenting like advantages and which are of a readily frangible character are contemplated by the invention.

The disk 24 is clamped against the O-ring 21 and against the outer annular land 22 of the fitting face 19 by means of an annular clamp ring 25 which is of sufficiently large diameter to overextend the groove 20. Thus, a metal-to-metal clamping action is exerted on disk 24 externally of the O-ring 21 and of the actual, effective central rupture area of disk 24, supplemented by the positive sealing action on the disk between said ring 25 and the compressible O-ring 21. By relieving the face 19 at internal land 23, I avoid the harsh, metal-to-metal gripping of the disk 24 immediately adjacent its bursting area which would tend to abrade, cut or weaken the same. To the same end, the adjacent inner, annular edge of the clamping ring 25, downstream of disk 24, is rounded at 26, in order to permit some slight flexing movement of the center portion of disk 24, at pressures beneath the critical bursting pressure, without presenting a cutting edge.

The foregoing arrangement combines the advantage of a positive, displacement resisting grip between the metal clamping ring 25 and the metal fitting 11, at the higher land 22 thereof, and a cushioned sealing grip of the disk at the O-ring 21. The disk is effectively held in place, yet it is not subjected to clamping stresses immediately adjoining the effective rupture area thereof such as would tear, burst or objectionably weaken the disk in said area. Notwithstanding all this, the unit is well sealed against hydrostatic pressure by the O-ring 21 bearing against its upstream side.

The discharge fitting 17 is outwardly flared at 27 adjacent the inner, coupled end thereof and a sealing gasket 28 of any appropriate compressible material is interposed between the end face 29 of said fitting 17 and the clamp ring 25. When tightly clamped up, the gasket 28 eliminates the possibility of leakage past the flared portion 27 of said fitting, following rupture of the disk 24 in operation.

In order to hold the parts in said assembled relation, the flange 15 of fitting 11 is crimped or spun inwardly, as at 29, against the outwardly flared conical surface 30 of the fitting portion 27. This is a very inexpensive way to produce a rupture disk assembly of unitary, self-contained character, which, because of the very low cost of its parts and their assembly, may be discarded following rupturing of disk 24, without the bother of reassembling the plurality of components ordinarily required in mounting a rupture disk. However, conventional types of threaded or other coupling arrangements may be employed in substitution for the crimped clamping arrangement herein disclosed, without departing from the spirit of the invention.

It is believed that the operation of the foregoing unit is sufficiently simple that further detailed description thereof is unnecessary. I desire that the invention be construed no more limitedly than is consistent with the appended claim.

I claim:

A rupture disk unit comprising a connector having an axial bore and an axially forwardly opening groove in an end face thereof which is disposed in generally concentric relation to said bore, said connector end face having a forwardly disposed outer surface surrounding said groove and an inner surface within said groove which is located closer to the bottom of said groove than said outer surface, said surfaces defining the immediate outer and inner edges of said groove, a sealing ring of compressible material disposed in said groove which, in uncompressed condition, is of a thickness sufficient to project forwardly of said outer surface, a readily rupturable disk disposed across said outer surface of said end face and said bore in sealing relation to said compressible sealing ring, a rigid annular clamp ring engaging the other side of said disk in an annular zone opposed to said outer surface, said clamp ring acting to clamp the outer portion of said disk rigidly against said outer surface and to compress said sealing ring flush with said outer surface, a compressible gasket engaging the surface of said clamp ring opposite said disk, a second connector having an axial bore in alignment with that of the first connector and disposed in operative clamping relation to said gasket to compress the latter against said clamp ring and said clamp ring against said disk, said inner end face surface being out of engagement with said disk in said clamped relation, and means to hold said connectors in clamping relation to said sealing ring, disk and clamp ring.

EVAN JONES.

REFERENCES CITED

The following references are of record in the file of this patent:

UNITED STATES PATENTS

| Number | Name | Date |
|---|---|---|
| 2,123,662 | Raymond | July 12, 1938 |
| 2,291,360 | Unger | July 28, 1942 |
| 2,291,374 | Canfield | July 28, 1942 |
| 2,437,836 | Santiago | Mar. 16, 1948 |
| 2,474,826 | Cantlin | July 5, 1949 |